US 7,272,129 B2

(12) United States Patent
Calcev et al.

(10) Patent No.: US 7,272,129 B2
(45) Date of Patent: Sep. 18, 2007

(54) METHOD AND APPARATUS FOR SYNCHRONIZING A NODE WITHIN AN AD-HOC COMMUNICATION SYSTEM

(75) Inventors: George Calcev, Hoffman Estates, IL (US); Jeffrey D. Bonta, Arlington Heights, IL (US); James P. Michels, Elk Grove Village, IL (US)

(73) Assignee: Motorola, Inc., Schaumburg, IL (US)

( * ) Notice: Subject to any disclaimer, the term of this patent is extended or adjusted under 35 U.S.C. 154(b) by 201 days.

(21) Appl. No.: 11/249,638

(22) Filed: Oct. 13, 2005

(65) Prior Publication Data

US 2007/0086424 A1    Apr. 19, 2007

(51) Int. Cl.
*H04J 3/06* (2006.01)
(52) U.S. Cl. .................. 370/338; 370/350; 455/41.2
(58) Field of Classification Search ............... 370/338, 370/350, 503; 375/356; 455/41.2, 41.3, 455/502
See application file for complete search history.

(56) References Cited

U.S. PATENT DOCUMENTS 6,466,608 B1*   10/2002  Hong et al. ............... 375/137
2004/0255001 A1*  12/2004  Oh et al. .................. 709/209

2007/0086426 A1*   4/2007  Bonta et al. ............... 370/350

OTHER PUBLICATIONS

R. Naik et al., "Distributed Sleep-Scheduling Protocols for Energy Conservation in Wireless Networks", Proceedings of 28th Hawaii International Conference on system Sciences, 2005-08.
Agree, J. et al.: Secure NOmadic Wireless Mesh (SnowMesh) 802.11 TGs ESS Mesh Networking Proposal, doc.: IEEE 802.11-05/596r1, May 15, 2005, pp. 1-56.
Proceedings of the 38th Hawaii International Conference on System Sciences—2005-08 Distributed Sleep-Scheduling Protocols for Energy Conservation in Wireless Networks.

* cited by examiner

*Primary Examiner*—Lee Nguyen

(57) ABSTRACT

A method and apparatus for synchronizing a node (200) within an ad-hoc communication system (100) is described herein. During operation all nodes periodically broadcast a synchronization beacon for other nodes to utilize for synchronization when a coordinating access point (node) is unavailable. A particular node's synchronization beacon will have an associated "tier" number that is incremented from the tier number of the beacon used to synchronize the particular node. In the absence of an access point, a node that joins the ad-hoc communication system will listen for synchronization beacons transmitted by other nodes. If synchronization beacons are heard, the node will synchronize with a beacon having a lowest tier. The node will then broadcast its own beacon having its tier number incremented from the lowest tier beacon heard.

8 Claims, 2 Drawing Sheets

200

100

METHOD AND APPARATUS FOR SYNCHRONIZING A NODE WITHIN AN AD-HOC COMMUNICATION SYSTEM

FIELD OF THE INVENTION

The present invention relates generally to ad-hoc communication systems and in particular, to a method and apparatus for synchronizing a node within such ad-hoc communication systems.

BACKGROUND OF THE INVENTION

Synchronization of nodes within ad-hoc communication systems is critical to proper system performance. Synchronization of nodes requires that each node's internal clock be set to the same system time within some margin of error. When nodes are synchronized, power-saving techniques can be implemented. Particularly, nodes can power down (sleep) for a predetermined period of time and power up (wake) at a specified time to insure that messages can be exchanged. Therefore, a need exists for a method and apparatus for synchronizing a node within an ad-hoc communication system.

DETAILED DESCRIPTION OF THE DRAWINGS

In order to address the above-mentioned need, a method and apparatus for synchronizing a node within an ad-hoc communication system is described herein. During operation, nodes periodically broadcast a synchronization beacon for other nodes to utilize for synchronization when a coordinating access point is unavailable. A particular node's synchronization beacon will have an associated "tier" number that is incremented from the tier number of the beacons used to synchronize the particular node. In the absence of an access point, a node that joins the ad-hoc communication system will listen for synchronization beacons transmitted by other nodes. If synchronization beacons are heard, the node will synchronize with beacons having a lowest tier. A clock bias/offset is adjusted based on receiving one or more beacons. Once the node is synchronized, the node will then broadcast its own beacon having its tier number incremented from the lowest tier beacon heard.

The above synchronization technique will allow for finer synchronization of nodes over a multiple hop network. The solution maintains compatibility to previously defined power save operation and does not require any modifications or indications from the physical layer. Additionally, the above synchronization technique uses minimal signaling overhead by utilizing existing messaging, and does not require any complex computation or processing on the node.

The present invention encompasses a method for a node to synchronize to an ad-hoc communication system. The method comprises the steps of listening for a plurality of synchronization beacons transmitted from a plurality of nodes. If synchronization beacons are heard, then a tier for each synchronization beacon heard is determined and synchronization takes place to a beacon having a lowest tier. A beacon is then transmitted having a tier greater than the lowest tier. If, however synchronization beacons are not heard, then a beacon is transmitted having a first tier.

The present invention additionally encompasses a method comprising the steps of determining that a synchronization beacon cannot be heard, creating a beacon having a tier number equal to zero, and a beacon identification field based on a node's physical address, and transmitting the beacon having the tier number and beacon identification field.

The present invention additionally encompasses an apparatus comprising a receiver listening for a plurality of synchronization beacons transmitted from a plurality of nodes, logic circuitry determining a tier for each synchronization beacon heard and synchronizing to a beacon having a lowest tier, and a transmitter transmitting a beacon having a tier greater than the lowest tier.

Figure 1:
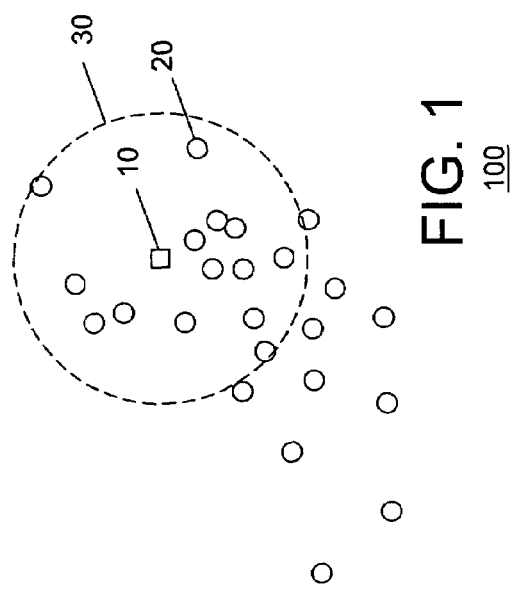
FIG. 1 is a block diagram of an ad-hoc communication system.

Turning now to the drawings, wherein like numerals designate like components, FIG. 1 illustrates an ad-hoc communication system 100. Communication system 100 preferably utilizes an ad-hoc communication system protocol defined by IEEE Standard 802.11. However one of ordinary skill in the art will recognize that other communication system protocols may be utilized without varying from the scope of the invention. For example, communication system 100 may utilize communication system protocols such as, but not limited to, Bluetooth™, IEEE Standard 802.15.1, IEEE 802.15.3, IEEE 802.15.4, IEEE 802.16, etc. As shown, communication system 100 includes a coordinating node (access point) 10 and a nodes 20 that may or may not be in communication range with coordinating node or access-point 10. Nodes 20 can be transportable (mobile) or they can be fixed in a given place. As nodes are activated, there is a need for them to either synchronize with a coordinating node or to synchronize with neighboring nodes when the coordinating node is unavailable (e.g., out of range).

Figure 2:
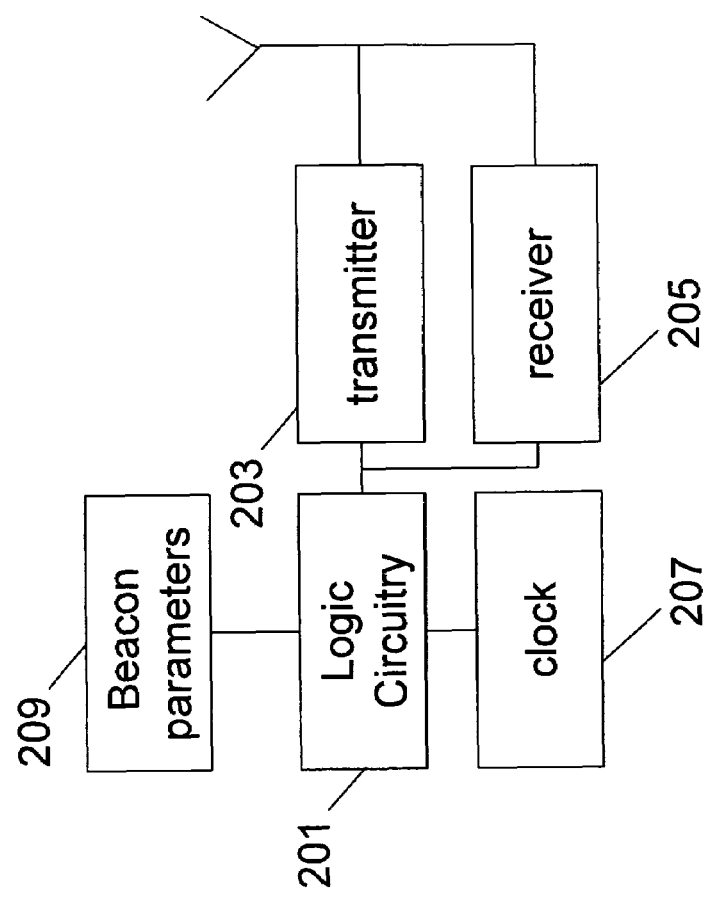
FIG. 2 is a block diagram of a node within the ad-hoc communication system of FIG. 1.

FIG. 2 is a block diagram of node 200. As shown, node 200 comprises logic circuitry 201, transmitter 203, receiver 205, clock 207, and beacon parameters database 209. During operation, logic circuitry 201 accesses receiver 205 and determines if a coordinating node's synchronization beacon can be received. If so, logic circuitry 201 accesses a timing field of the beacon and adjusts clock 207 accordingly. More particularly, after receiving a predetermined number ($N_{sync\_beacons}$) beacons, logic circuitry 201 can establish its own clock bias/offset relative to the Beacon Transmission Time received in each of the beacons. Logic circuitry 201 then adjusts its own clock relative to the clock of the coordinating node.

If a coordinating node beacon cannot be received, logic circuitry 201 accesses receiver 205 and determines if synchronization beacons from other non-coordinating nodes 20 can be received. If other nodes synchronization beacons are received, the beacons' tiers are analyzed and synchronization takes place (as described above) utilizing the beacons having the lowest tier. Beacon parameters are then updated by logic circuitry 201. Such beacon parameters include, but are not limited to:

TABLE 1

Beacon Parameters and their associated definition

| PARAMETERS | DEFINITION |
|---|---|
| Beacon Identification | Unique beacon ID based upon a physical address of the tier #0 node (e.g., a MAC address) |
| Tier Number | Identifies the number of hops toward the tier #0 node. |
| Beacon Interval | Interval of time between beacon transmissions |
| Beacon Transmission Time | The time of transmission of the currently received beacon |
| BSSID | Unique network ID of synchronized nodes |
| Infrastructure Access Index | Identifies whether a mesh access point is part of the current synchronized network |

If, however, no coordinating device is heard, and after a predetermined period of time ($T_{presync}$) no beacon is heard from non-coordinating nodes, node 200 will become a first tier (tier #0) node. Beacon parameters are updated accordingly by logic circuitry 201 to reflect this. Logic circuitry 201 will then instruct receiver 205 to periodically transmit the tier #0 beacon with a beacon ID based upon the physical address of the tier #0 node. (A physical address is a hardware address that uniquely identifies each node of a network and is unchanging. Such an address is usually "hard wired" into the node during its manufacture. In networks using an IEEE 802.11 protocol, the physical address comprises a Medium Access Controller (MAC) address).

No matter what tier # a node's beacon currently is associated with, all nodes in the network share the responsibility of periodically broadcasting beacons at beacon intervals relative to the adjusted clock. If a neighboring node hears the beacons, it will synchronize to the beacon having the lowest tier #, and begin transmitting its own synchronization beacon with a beacon ID based upon the Medium Access Controller Address of the tier #0 node.

Figure 3:
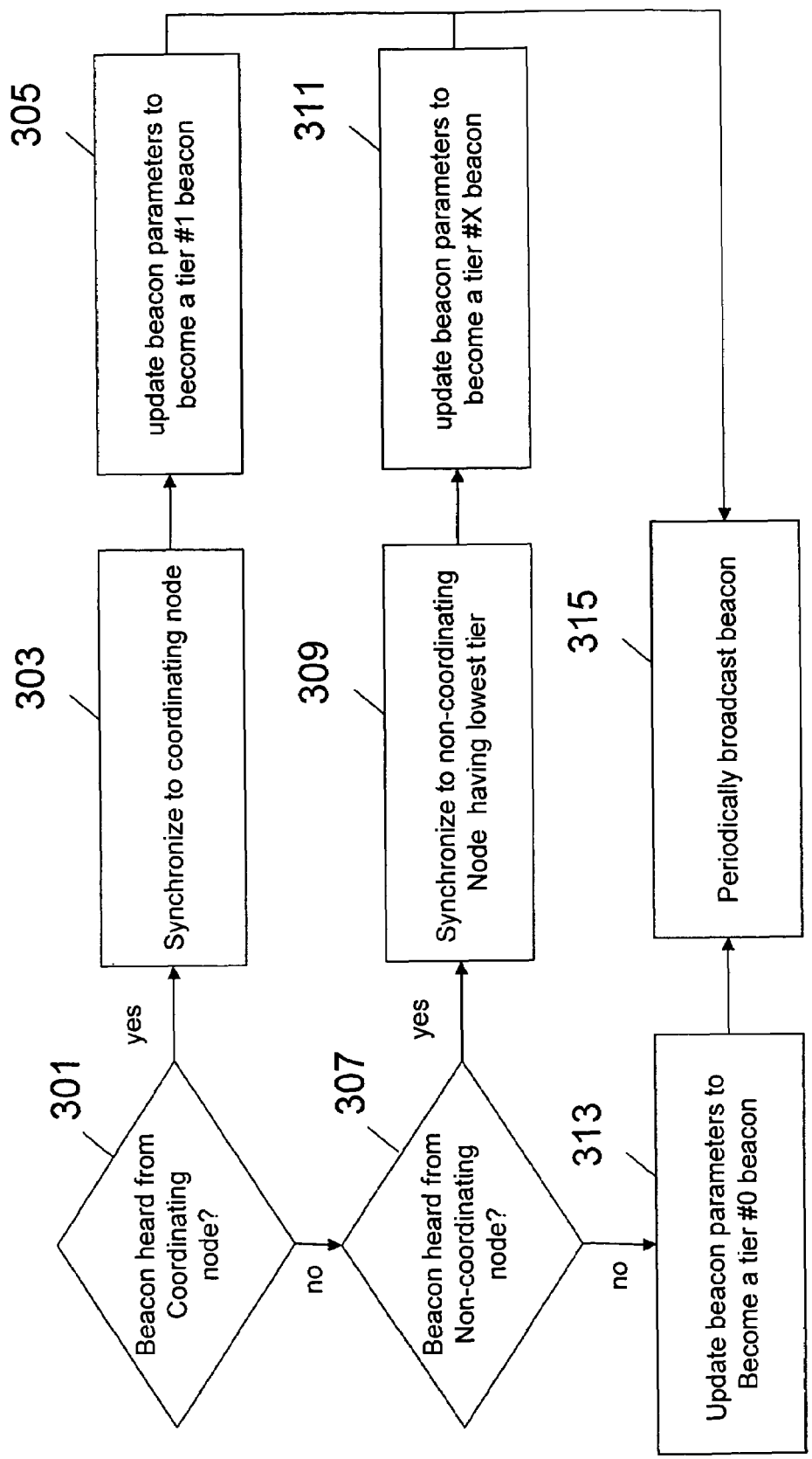
FIG. 3 is a flow chart showing operation of the node of FIG. 2.

FIG. 3 is a flow chart showing operation of node 200 during synchronization. It is assumed that receiver 205 periodically scans (listens) for a plurality of beacons transmitted from a plurality of nodes. The logic flow begins at step 301 where logic circuitry 201 accesses receiver 205 and determines if a beacon is heard from a coordinating node 20 (i.e., a tier #0 node). If so, the logic flow continues to step 303 where synchronization takes place utilizing the coordinating node's beacon and the logic flow continues to step 305 where logic circuitry updates beacon parameters to become a tier #1 beacon. The logic flow then continues to step 315.

If, at step 301, no coordinating node's beacon is heard, the logic flow continues to step 307 where logic circuitry 201 accesses receiver 205 and determines if beacons from non-coordinating nodes are heard. If so, the logic flow continues to step 309 where logic circuitry 201 determines a tier for each beacon heard and synchronizes to the beacon(s) having the lowest tier ($TIER_{LOWEST}$). The logic flow then continues to step 311 where logic circuitry 201 updates beacon parameters to become a tier #X beacon, where X is a numeral incremented by one from $TIER_{LOWEST}$. The logic flow then continues to step 315.

Returning to step 307, if logic circuitry 201 determines that no synchronization beacons are heard, then the logic flow continues to step 313 where logic circuitry updates beacon parameters to become a tier #0 node (e.g., first tier, or Tier Number=0 node). The logic flow continues to step 315.

At step 315 logic circuitry creates a synchronization beacon comprising a beacon identification and the tier number and instructs transmitter 203 to periodically broadcast the synchronization beacon. As discussed above, the beacon identification comprise a physical address (e.g., a MAC address) of the tier #0 node.

Synchronization Maintenance

In a synchronization maintenance mode, each node 200 continuously monitors the Beacon Transmission Time received in beacons from neighboring nodes to determine if a beacon exists having a lower tier than the beacon utilized for synchronization. Once beacons are identified containing a lower tier number, node 200 begins to reestablish synchronization with these beacons. When $N_{sync\_beacons}$ beacons are received, node 200 can reestablish its own clock bias/offset relative to the Beacon Transmission Time received from each of the beacons with a lower tier number. The node then adjusts its own clock relative to the clock of node 200 that transmitted the beacons. Once synchronization is reestablished, node 200 will always send future beacons with a tier number one greater than the tier of the beacon it synchronized with. If no beacons are received from a node with a lower tier number, then four possible scenarios develop:

1) If node 200 currently has a Synchronization Tier Number of zero, then node 200 will continue to represent the reference clock and will continue to broadcast beacons.

2) If node 200 currently has a Synchronization Tier Number of 1, then node 200 will reestablish synchronization with a node with either an equal tier number or a larger tier number, giving preference to the smallest possible tier number. After receiving $N_{sync\_beacons}$ beacons, node 200 will average the beacon times to reestablish its own clock bias/offset relative to the Beacon Transmission Time received. Once synchronization is reestablished, node 200 will always send future beacons with a tier number one greater than the tier of the beacon it synchronized with.

3) If node 200 has a Synchronization Tier Number greater than 1, then node 200 first attempts to reestablish synchronization with a node having an equal Synchronization Tier Number. After receiving $N_{sync\_beacons}$ beacons with an equal Synchronization Tier Number, node 200 will average the beacon times to reestablish its own clock bias/offset relative to the Beacon Transmission Time received. The node will rebroadcast beacons using the same Synchronization Tier Number.

4) If node 200 has a Synchronization Tier Number greater than 1 and there are no beacons with lower or equal Synchronization Tier Numbers, then node 200 is considered orphaned.

a. If the Infrastructure Access Index indication (a zero indicates that an access point can be reached via single or multiple hops through nodes in the synchronized network) is set to zero in all received beacons with a greater Synchronization Tier Number, then node 200 will start a resynchronization procedure after a timeout $T_{resync\_period}$.

b. If the Infrastructure Access Index indication is non-zero in beacons received with a greater Synchronization Tier Number, then node 200 will reestablish synchronization with a node with a larger tier number, giving preference to the smallest possible tier number. After receiving $N_{sync\_beacons}$ beacons, node 200 will average the beacon times to reestablish its own clock bias/offset relative to the Beacon Transmission Time received.

Once synchronization is reestablished, node 200 will always send future beacons with a tier number one greater than the beacon that it synchronized with.

In synchronization maintenance mode, all nodes in the network share responsibility to send beacons relative to the adjusted clock. Additionally, all nodes shall rebroadcast beacons with the same BSSID, Beacon ID, Beacon Interval, and Infrastructure Access Index indication values that were received in beacons which node 200 utilized for synchronization. Additionally, all nodes randomly set a timeout to force a resynchronization of the network after at least $T_{resync\_period}$ seconds.

Resynchronization

The resynchronization procedure ensures that the node's reference clock 207 is maintained and that the tier #0 node that all other nodes synchronize to is periodically changing. This is particularly useful if node 200 has disconnected or is moving away from the synchronized network. Resynchronization is performed periodically (after a timeout equal to $T_{resync\_period} + T_{resync\_period} *$ random interval) or on demand. It is a procedure that is self appointed by any node except for the current reference (tier #0) node.

During resynchronization, a new beacon ID (based on the self appointed node's MAC address) is broadcast in the self appointed node's beacons. All nodes that receive a beacon with a new beacon ID and the same BSSID (regardless of the tier number they are currently affiliated with) will recognize the beacon as a resynchronization procedure.

When each node receives the resynchronization beacon, it shall add a backoff timer of $T_{sync\_backoff}$ seconds to its current resynchronization period timer $T_{resync\_period}$, thus delaying its attempt to force resynchronization of the network with its clock being used as the reference clock. When each node receives the resynchronization beacon, it synchronizes with beacons containing the smallest tier number as described above.

Merging Networks

As synchronized nodes move about, a merge of independently synchronized groups of nodes with different BSSIDs may be necessary as the groups come together. This merge will enable the two networks to use a common reference clock.

A base station ID (BSSID) uniquely identifies a network of synchronized nodes. Within a synchronized network, resynchronization will alter the beacon ID. There is a need to also uniquely identify a network so that when two networks come together, the need to merge is recognized. Without this, if a node saw a different beacon ID, it would think this is a resynchronization rather than a merging of networks. To provide a consistent approach for a merge of these networks, the BSSID is used to determine which network will maintain the reference synchronization clock and which must resynchronize to the reference clock. The method for detecting the need for a merge is triggered by the reception by a node of a beacon with a BSSID that is different than the one it currently is synchronized with. Upon recognizing the presence of another network with a different BSSID, node 200 will compare both the Infrastructure Access Index indication and the BSSID in the beacon received from the other network with its own copy of these parameters to determine if a network merge is required.

If the Infrastructure Access Index indication is set in the local node's network, then there shall be no attempt by this node to merge its network with the other network (i.e. the local network will maintain its current clock reference).

If the Infrastructure Access Index indication is being broadcast by other networks' beacons (i.e. the other network nodes have mesh membership with a network coordinator), then the network that does not have mesh membership with a network coordinator must resynchronize to the reference clock of the network that does have mesh membership with a network coordinator.

If the Infrastructure Access Index indication is set in both networks (i.e. both networks have mesh membership with a network coordinator), then there shall be no attempt to merge networks.

If the BSSID from the other network's beacon is larger than node 200's current copy of the BSSID, then a network merge is required as defined below.

If the BSSID from the other network's beacon is smaller than node 200's current copy of the BSSID, then node 200 will discard the information received in the beacon from the other network and will remain in synchronization maintenance mode looking for beacons with the same BSSID.

If a network merge is required, then node 200 will set the Network Merge indication in its beacon for the next $N_{merge\_announce}$ beacons. The beacon's BSSID Merge field shall also contain the BSSID that identifies the new network to be merged into. The Network Merge indication in the beacon requires each recipient whose BSSID is different than the one contained in the BSSID Merge field to come out of power save mode for a maximum of $N_{merge\_awake}$ beacon intervals. Each node that receives the beacon with the Network Merge indication shall broadcast $N_{merge\_announce}$ beacons with the Network Merge indication provided that its current BSSID is different than the one contained in the BSSID Merge field.

After broadcasting $N_{merge\_announce}$ beacons, node 200 will begin to synchronize with the new network. Synchronization with the target BSSID network contained in the BSSID Merge field will occur as discussed above. Once each node synchronizes with beacons containing the new BSSID from the BSSID Merge field, it updates its own BSSID field, clear the Network Merge indication and BSSID Merge field, and return to power save mode.

In an alternate embodiment, the requirement for a network merge may be assessed based upon the relative ad-hoc network size rather than the absolute value of the BSSID. Thus, when the presence of a different network is detected based on the BSSID of a received beacon, an optional beacon parameter (Relative Network Size) containing a representation of the relative size of the adjacent network is compared with the receiving node's estimation of the network size. The Relative Network Size is a bit map where each bit is a hashed index of an ad hoc network node's MAC address. The number of bits is engineered for desired accuracy. In this alternative embodiment, the number of bits that are set represents the size of the network. Alternatively, the actual network size may be computed and used as the Relative Network Size. If the representation of the Relative Network Size from the other network's beacon is larger than node 200's current copy of the Relative Network Size, then a network merge is required. If the representation of the Relative Network Size from the other network's beacon is smaller than node 200's current copy of the Relative Network Size, then node 200 will discard the information received in the beacon from the other network and will remain in synchronization maintenance mode looking for beacons with the same BSSID. During initial synchronization and synchronization maintenance, each node adds its own bit to the other bits in the bit map received in a beacon (initially all bits are set to zero) provided that the Network Size Sequence Number received in the beacon is larger than the Network Size Sequence Number last broadcast in a beacon by node 200. The Network Size Sequence Number is a beacon parameter that accompanies the Relative Network Size beacon parameter. Once node 200 adds a bit to the Relative Network Size, it increments its own copy of the Network Size Sequence Number before broadcasting the next beacon.

Finally, a periodic reset of the Relative Network Size bit map is recommended during synchronization maintenance. Any node can initiate this reset. A node will reset the Relative Network Size bit map (thus initializing the network size representation), set its own bit, and then increment the beacon sequence number. Once a surrounding node hears the beacon with an incremented sequence number, it knows that it should add its bit to the map and propagate the new bit map in subsequent beacons that it broadcasts.

Synchronization Procedure (Partial Network Coordinator Coverage Available)

When a node moves in and out of coverage of a network coordinator, three possible scenarios exist for synchronization and association. The node is either, a) unsynchronized with any network, b) synchronized with a non-network coordinator reference clock, or c) synchronized with a network coordinator reference clock. These 3 scenarios will be addressed below.

Merging Unsynchronized Node into a Mesh Service Area

This first scenario does not require any change from the current method of association and synchronization of a node with a network coordinator (i.e. becoming a mesh member of a network coordinator). This occurs with mobility or power on scenarios and only applies to single hop synchronization. Once node 200 becomes a mesh member of the network coordinator, it will set its Synchronization Tier Number to 1 (the network coordinator will always be a tier #0 node) and the Infrastructure Access Index indication will be set to 1.

Merging IBSS Synchronized node into Mesh Membership with a Network Coordinator

This scenario represents the transition from a disconnected mesh to a connected mesh. This occurs when a node is synchronized with other nodes outside of mesh membership with a network coordinator, and is now able to receive beacons from a network coordinator (i.e. IBSS synchronized nodes desire to synchronize with network coordinator). These IBSS synchronized nodes may be sleeping in power save mode. Since it is likely that their beacons are being broadcast asynchronously to the network coordinator beacons, every $T_{BSS\_search}$ seconds they shall periodically remain out of power save mode for $N_{BSS\_search}$ beacon intervals. The non-power save time will enable any IBSS synchronized node to have the opportunity to recognize that mesh membership with a network coordinator is available. Hence, when a node without network coordinator mesh membership receives a beacon with a different BSSID and a Infrastructure Access Index indication that is set to 1.

Dropping Mesh Membership with a Network Coordinator

This scenario represents the possible transition from a connected mesh to a disconnected mesh. This occurs if a tier #1 node with mesh membership to a network coordinator stops receiving beacons from tier #0 (i.e. the network coordinator). This scenario has two possible outcomes:

1) If node 200 has a tier number of 1, it will begin broadcasting beacons using the same tier number, but with its Infrastructure Access Index indication set to zero.
2) If node 200 has a tier number greater than 1, node 200 will perform "Synchronization Maintenance" with the following rule modifier. If node 200 is receiving beacons from neighboring nodes with a smaller or equal tier number and with conflicted Infrastructure Access Index indications set to either zero or 1, node 200 will only synchronize with those beacons that have a Infrastructure Access Index indication set to 1.

Once a node stops receiving beacons from any lower, equal, or higher tier nodes with the Infrastructure Access Index indication set to 1, then the WLAN mesh is entering a disconnected mesh state. At this time, node 200 can start a timer $T_{resync\_period}$ to prepare for a resynchronization of the network.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for a node to synchronize to an ad-hoc communication system, the method comprising the steps of:
   listening for a plurality of synchronization beacons transmitted from a plurality of nodes;
   if synchronization beacons are heard, performing the steps of:
      determining a tier for each synchronization beacon heard;
      synchronizing to a beacon having a lowest tier;
      transmitting a beacon having a tier greater than the lowest tier; and
   if synchronization beacons are not heard, performing the steps of:
      transmitting a beacon having a first tier.

2. The method of claim 1 wherein the step of transmitting the beacon comprises the steps of:
   creating the beacon comprising a beacon identification and a tier number; and
   transmitting the beacon having the beacon identification and a tier number.

3. The method of claim 1 wherein the step of transmitting the beacon having the beacon identification and the tier number comprises the step of transmitting the beacon having a physical address of the tier #0 node as the beacon identification.

4. The method of claim 1 wherein the step of transmitting the beacon having the beacon identification and the tier number comprises the step of transmitting the beacon having a medium access controller address of the tier #0 node as the beacon identification.

5. The method of claim 1 wherein the step of transmitting the beacon having the first tier comprises the step of transmitting the beacon having a tier equal to zero.

6. The method of claim 1 wherein the step of transmitting the beacon having the tier greater than the lowest tier comprises the step of transmitting the beacon having a tier incremented by one from the lowest tier.

7. The method of claim 1 further comprising the steps of:
   determining that a beacon exists having a lower tier than the beacon utilized for synchronization; and
   reestablishing synchronization to the beacon having the lower tier.

8. The method of claim 7 further comprising the step of:
   transmitting a beacon having a tier greater than the beacon used to synchronize with.

* * * * *